US012801442B2

(12) United States Patent
Yannuzzi et al.

(10) Patent No.: US 12,801,442 B2
(45) Date of Patent: Nov. 17, 2026

(54) PROMPT OBSERVABILITY AND ESTIMATED PRODUCTIVITY GAIN INSIGHTS USING PROMPT PROCESSING UNITS

(71) Applicant: Cisco Technology, Inc., San Jose, CA (US)

(72) Inventors: Marcelo Yannuzzi, Nuvilly (CH); Arash Salarian, Chardonne (CH); Reginaldo Emanuel Ribeiro Costa, Epalinges (CH); Jean Andrei Diaconu, Gaillard (FR); Hervé Muyal, Gland (CH)

(73) Assignee: Cisco Technology, Inc., San Jose, CA (US)

(*) Notice: Subject to any disclaimer, the term of this patent is extended or adjusted under 35 U.S.C. 154(b) by 413 days.

(21) Appl. No.: 18/606,164

(22) Filed: Mar. 15, 2024

(65) Prior Publication Data

US 2025/0251986 A1 Aug. 7, 2025

Related U.S. Application Data

(60) Provisional application No. 63/549,239, filed on Feb. 2, 2024.

(51) Int. Cl.
*G06F 3/00* (2006.01)
*G06F 9/50* (2006.01)

(52) U.S. Cl.
CPC .................................. *G06F 9/5038* (2013.01)

(58) Field of Classification Search
CPC .......................................................... G06F 9/48
See application file for complete search history.

(56) References Cited

U.S. PATENT DOCUMENTS 12,380,369 B1 * 8/2025 Joshi ...................... G06N 20/00
12,579,974 B1 * 3/2026 Lu .......................... G10L 15/183
2020/0005157 A1 1/2020 Rosenstein et al.
2022/0318763 A1 10/2022 Lee et al.
(Continued)

FOREIGN PATENT DOCUMENTS

WO 2023022727 A1 2/2023

OTHER PUBLICATIONS

Ren'e Caspart, Precise Energy Consumption Measurements of Heterogeneous Artificial Intelligence Workloads. (Year: 2021).*
(Continued)

*Primary Examiner* — Lechi Truong
(74) *Attorney, Agent, or Firm* — Merchant & Gould P.C.; Kenneth J. Heywood

(57) ABSTRACT

In one implementation, a method is disclosed comprising: estimating, by a device, an amount of time that a large language model would take to perform a task indicated by a prompt; estimating, by a device, an amount of time that one or more users would take to perform the task indicated by the prompt; determining, by the device, a resource savings associated with the large language model performing the task, based on a comparison between the amount of time that the large language model would take to perform the task and the amount of time that the one or more users would take to perform the task; and providing, by the device, an indication of the resource savings for display by a user interface.

20 Claims, 16 Drawing Sheets

(56) References Cited

U.S. PATENT DOCUMENTS

| | | | |
|---|---|---|---|
| 2023/0274089 A1 | 8/2023 | Tunstall-Pedoe et al. | |
| 2024/0020546 A1 | 1/2024 | Vu et al. | |
| 2024/0311192 A1* | 9/2024 | Maschmeyer | G06F 9/5027 |
| 2024/0362363 A1* | 10/2024 | Jannink | G06F 21/6254 |
| 2025/0238615 A1* | 7/2025 | Margolin | G06F 40/35 |
| 2025/0258843 A1* | 8/2025 | Gerber | G06F 16/288 |
| 2025/0272471 A1* | 8/2025 | Yarlagadda | G06F 40/106 |
| 2025/0315435 A1* | 10/2025 | Ben-Bassat | G06F 16/24565 |
| 2026/0111708 A1* | 4/2026 | Guo | G06N 3/0455 |
| 2026/0112102 A1* | 4/2026 | Bolnykh | G01S 15/89 |
| 2026/0148118 A1* | 5/2026 | Brennan | G06N 7/01 |

OTHER PUBLICATIONS

Arthur: “The AI Delivery Engine”, retrieved from arthur.ai/ on Feb. 20, 2024, 13 Pages.

AWS: “Amazon Bedrock”, Build Generative AI Applications with Foundation Models, retrieved from https://aws.amazon.com/bedrock/ on Feb. 12, 2024, 8 Pages.

Cisco Umbrella: “Cisco Umbrella Data Loss Prevention (DLP)”, retrieved from https://umbrella.cisco.com/products/data-loss-prevention-dlp on Feb. 12, 2024, 7 Pages.

Cook A., “The Definitive Guide to Einstein GPT (Salesforce AI)”, Oct. 27, 2023, retrieved from salesforceben.com/the-definitive-guide-to-einstein-gpt-salesforce-ai/, accessed on Feb. 20, 2024, 16 pages.

Google Cloud: “Vertex AI”, Gemini 1.5 Pro, retrieved from https://cloud.google.com/vertex-ai?hl=en on Feb. 12, 2024, 14 Pages.

Lakera: “Protect Your AI against Safety and Security Threats, Instantly”, retrieved from lakera.ai/ on Feb. 12, 2024, 17 Pages.

Microsoft Azure: “Azure Machine Learning”, retrieved from https://azure.microsoft.com/en-in/products/machine-learning on retrieved on Feb. 12, 2024, 11 Pages.

Patented.AI: “The Most Power AI Engine for Intellectual Property”, retrieved from https://www.patented.ai/ on Feb. 20, 2024, 5 Pages.

PrivateAI: “The Privacy Layer for Contact Centers”, retrieved from private-ai.com/ on Feb. 12, 2024, 15 Pages.

Salesforce: “Explaining the Einstein Trust Layer”, Artificial Intelligence, retrieved from https://www.salesforce.com/news/stories/video/explaining-the-einstein-gpt-trust-layer/, accessed on Feb. 12, 2024, 58 Pages.

* cited by examiner

900

1000

1004

PROMPT OBSERVABILITY AND ESTIMATED PRODUCTIVITY GAIN INSIGHTS USING PROMPT PROCESSING UNITS

PRIORITY CLAIM

This application claims the benefit of U.S. Provisional Patent Application No. 63/549,239 by Yannuzzi et al. filed Feb. 2, 2024, which is incorporated by reference herein in its entirety.

TECHNICAL FIELD

The present disclosure relates generally to computer networks, and, more particularly, to prompt observability and estimated productivity gain insights using prompt processing units.

BACKGROUND

The use of generative artificial intelligence (AI) is helping to augment productivity across enterprises. Indeed, enterprises are increasingly using pre-trained Large Language Models (LLMs), fine-tuned models, and agents offered or hosted by third party providers, to support a myriad of enterprise tasks. These models are usually served as part of larger systems that may also include pre-integrated application programming interfaces (APIs) and/or tools to orchestrate, execute, and chain various tasks before responding to a query carried in a prompt.

Although many enterprises aim to use generative AI more in the near future, concerns remain regarding the resource consumption associated with using a generative model, as well as the ability of the enterprise to maintain visibility and control over sensitive data being used as part of this utilization. Consequently, there is often a hesitance within enterprises to adopt the use of generative AI, given the absence of data visibility and uncertainty around resource consumption. Further, even upon adoption, there is typically a high degree of inefficiency and suboptimal utilization of generative AI resources across an enterprise due to the lack of visibility into the relationship between the use of a model and its performance.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device may estimate an amount of time that a large language model (LLM) would take to perform a task indicated by a prompt. The device may estimate an amount of time that one or more users would take to perform the task indicated by the prompt. The device may determine a resource savings associated with the LLM performing the task, based on a comparison between the amount of time that the LLM would take to perform the task and the amount of time that the one or more users would take to perform the task. The device may provide an indication of the resource savings for display by a user interface.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
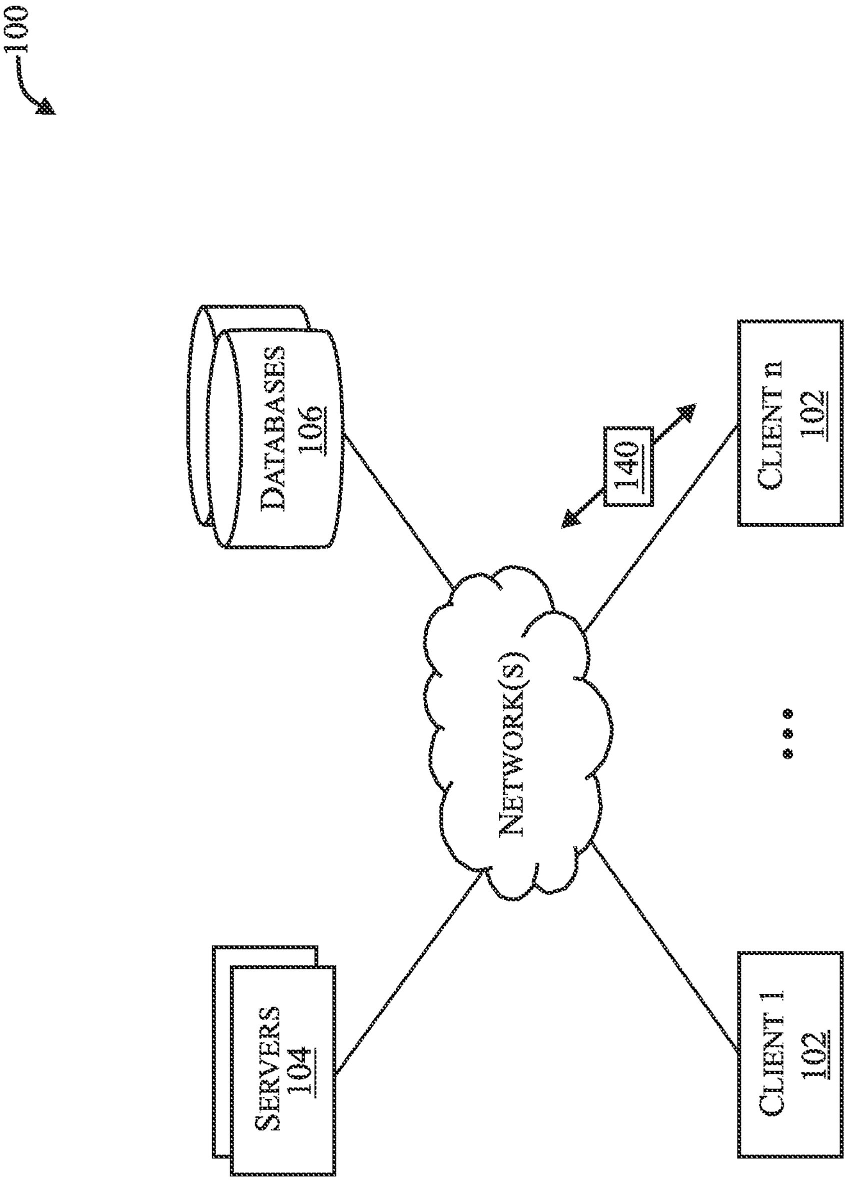
FIG. 1 illustrates an example computing system.

FIG. 1 is a schematic block diagram of an example simplified computing system (e.g., computing system 100) illustratively comprising any number of client devices (e.g., client devices 102 (e.g., a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
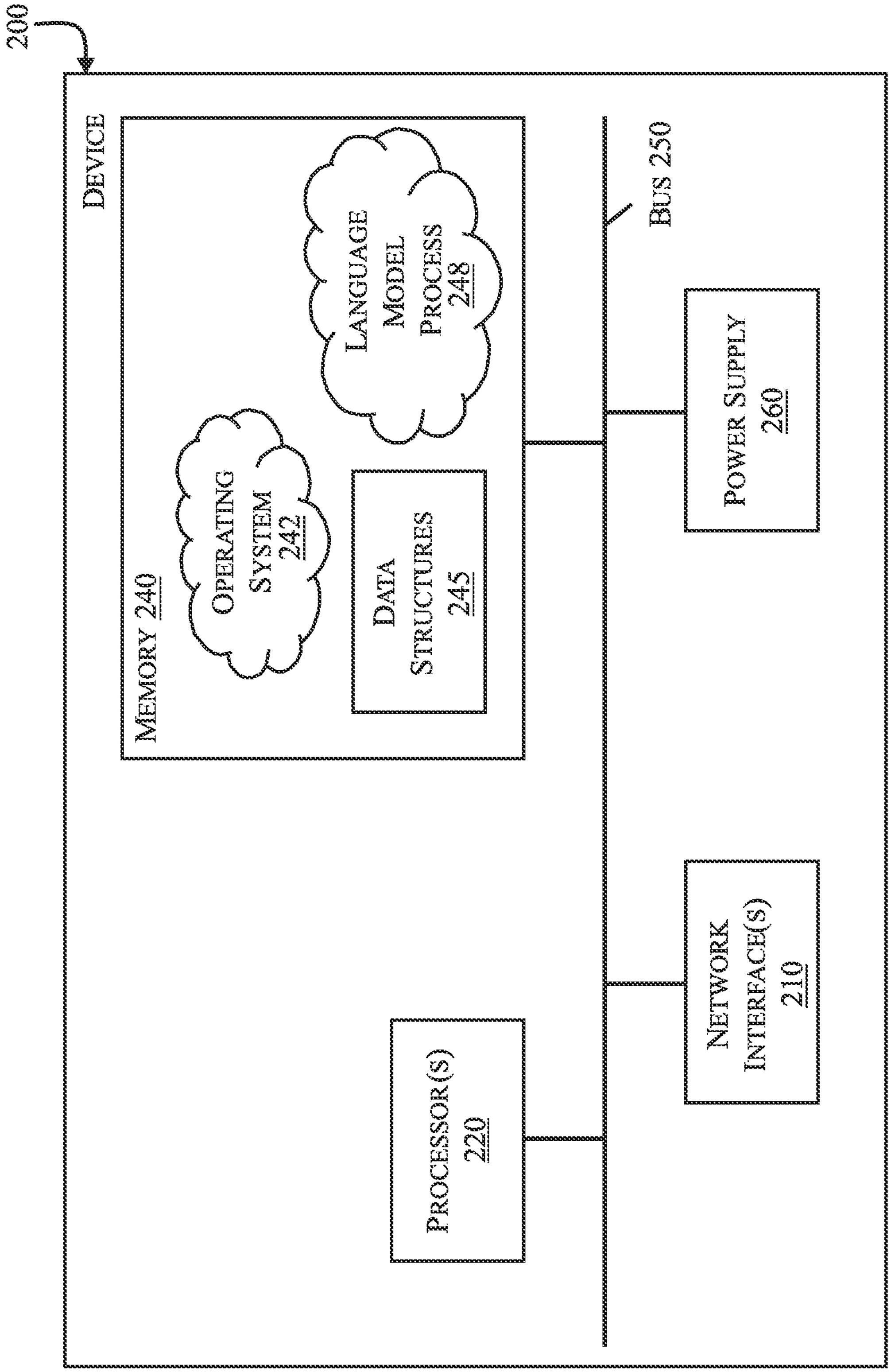
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components and/or services may comprise an language model process 248 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, language model process 248 may include computer-executable instructions that, when executed by processor(s) 220, cause device 200 to perform the techniques described herein. To do so, in some implementations, language model process 248 may utilize machine learning. In general, machine learning is concerned with the design and the development of techniques that take as input empirical data (such as network statistics and performance indicators) and recognize complex patterns in these data.

In various implementations, language model process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that language model process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, language model process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, language model process 248 may use a generative model to generate synthetic network traffic based on existing user traffic to test how the network reacts. Example generative approaches can include, but are not limited to, generative adversarial networks (GANs), large language models (LLMs), other transformer models, and the like.

As noted above, although many enterprises aim to leverage generative AI, they lack the ability to understand, observe, and apply task-dependent policies to prompts/requests from their employees, before those prompts are sent to an external LLM for processing. It should also be noted that while some LLMs and agents are able to interpret open-ended prompts to understand and act upon the tasks requested, this is after the prompt has already been sent to the LLM for processing. In fact, this lack of understanding at the enterprise level hinders the enterprise from gaining visibility into the prompts and to implement effective controls and policies before the prompts are processed by external entities.

Furthermore, enterprises presently lack solutions to automatically quantify, assess, and act on the productivity gains attained while using generative AI, as well as the ability to automatically identify and observe the pool of tasks that yield the largest returns (e.g., the set of tasks that saved the most time to their employees).

Prompt Observability and Estimated Productivity Gain Insights Using Prompt Processing Units The techniques described herein introduce a mechanism for prompt observability and/or productivity gain estimations using a Prompt Processing Unit (PPU). For example, these techniques introduce PPUs operable to characterize and distill key features from a prompt in a systematic manner. In addition, observability techniques are introduced that leverage these characterizations.

More specifically, the techniques described herein may facilitate an enterprise in defining and applying rules that enable visibility controls working in tandem with a PPU, with a focus on observing and understanding the nature of the requests carried in the prompts. This may include the automated detection, characterization, and observation of the tasks requested to a generative AI at inference time. Moreover, these techniques may deliver visibility and insights into what sensitive data is used, sent, and/or received and for which specific tasks, including fine-grained observability and insights into infringements to corporate policies and/or data controls at inference time.

In addition, an enterprise may use the described techniques to estimate and observe the time savings associated with generative AI utilization versus non-model-powered tasks. In some aspects, the techniques described herein may provide a breakdown of the task requested by a prompt into a set of subtasks, automatically estimate the time that it would take an employee to execute each subtask (and overall task), without the assistance of generative AI. This information can be useful for purposes such as facilitating the templating of prompts, particularly for the tasks that yield the largest returns (e.g., in terms of time or other resource savings). In addition, the system may apply the techniques herein at various times, such as at inference time, during few-shot prompting, during fine-tuning processes, or the like.

Illustratively, the techniques described herein may be performed by hardware, software, and/or firmware, such as in accordance with language model process 248, which may include computer executable instructions executed by the processor(s) 220 (or independent processor of the network interfaces 210) to perform functions relating to the techniques described herein. Further, they may be combined with post-processing methods to provide aggregated and/or historical visibility of prompt features and insights across an enterprise.

Specifically, according to various implementations, a device may estimate an amount of time that a large language model (LLM) would take to perform a task indicated by a prompt. The device may estimate an amount of time that one or more users would take to perform the task indicated by the prompt. The device may determine a resource savings associated with the LLM performing the task, based on a comparison between the amount of time that the LLM would take to perform the task and the amount of time that the one or more users would take to perform the task. The device may provide an indication of the resource savings for display by a user interface.

Figure 3:
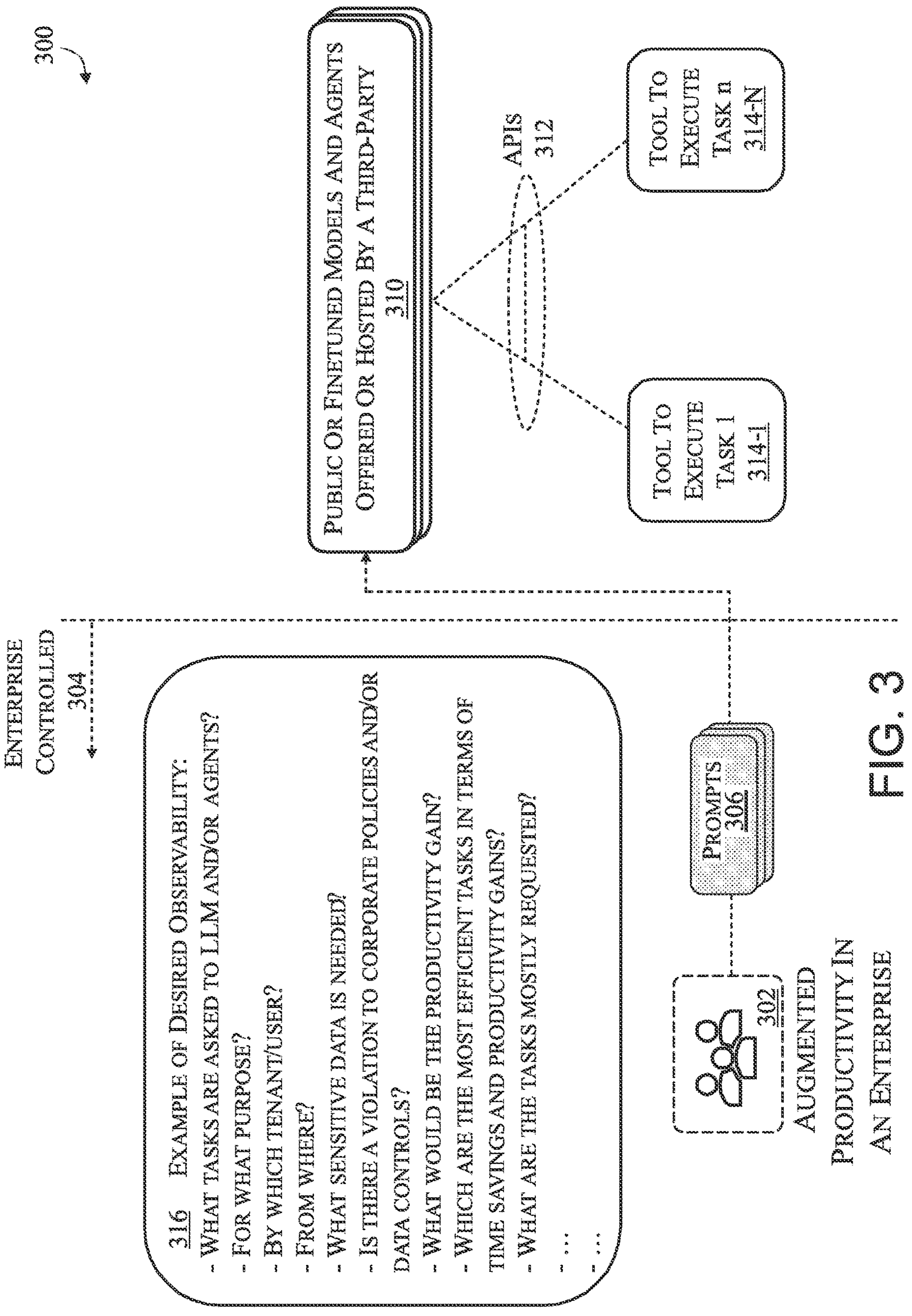
FIG. 3 illustrates an example of an environment for deploying a prompt processing unit-based observability and estimated productivity gain system.

Operationally, FIG. 3 illustrates an example of an environment 300 for deploying prompt processing unit (PPU)-based observability and estimated productivity gain mechanisms. In environment 300, the system may include an enterprise-controlled portion 304 via which prompts 306 are submitted (e.g., via a user chat interface or an API). The ability of users 302 to submit these prompts 306 may facilitate augmented productivity. For instance, sales, marketing, customer support, data analytics, engineering, product management, etc. may all utilize the prompts 306 to enhance their productivity.

Typically, the system may pass prompts 306 to a machine learning model 310 for processing and/or execution. For instance, machine learning model 310 may be a generative AI model, such as an LLM or other language and/or vision model. In some instances, machine learning model 310 may include a public or finetuned model and/or agents offered or hosted by a third party.

Although many enterprises aim to leverage generative AI, they may also want to observe what tasks are requested by prompts 306 for performance by machine learning model 310. Additionally, users may want to observe and understand the effectiveness of machine learning model 310 in completing the requested tasks as well as what data is sent, used, and returned by these third-party systems. Consequently, while prompts 306, users 302, and any corresponding API calls that they may make may be within the enterprise-controlled portion 304, an enterprise may wish to capture observability features 316 to enable more sophisticated controls over the sending of prompts 306 outside the enterprise.

For example, observability features 316 may include the capacity to detect and observe what tasks are requested to external models and/or agents, what sensitive data is needed, or what would be the productivity gain if the task is successfully completed by machine learning model 310 may be included. These and other observability features may be enabled, and facilitated, by the disclosed techniques using prompt processing units (PPUs). In addition, tools 314 (e.g., 314-1 . . . 314-N) for executing various tasks may be communicatively coupled (e.g., via APIs 312) to the machine learning model 310 and/or may be operable to participate in the execution of tasks specified in prompts 306.

Machine learning model 310 and/or tools 314 may be equipped to "interpret" open-ended prompts and act upon them by generating artifacts or executing various tasks based on such "understanding." However, this skill is not accessible to an enterprise attempting to gain visibility and institute controls within the enterprise-controlled portion 304. This lack of understanding and natural-language native techniques hinders the observation and comprehension of what are the tasks requested, or what sensitive data would be involved to complete such tasks, and thus, the ability to apply effective controls before the prompts are processed by external entities.

However, these features may be enabled, and facilitated, within environment 300 using prompt processing units (PPUs). Hence, environment 300 may be modified by incorporating an observability system that leverages the PPUs. For example, the PPUs may parse a query and/or detect a set of key features from prompts 306 in a systematic manner. The observability system may then leverage these characterizations to allow for sophisticated controls based on prompt observability and estimated productivity gains.

Figure 4:
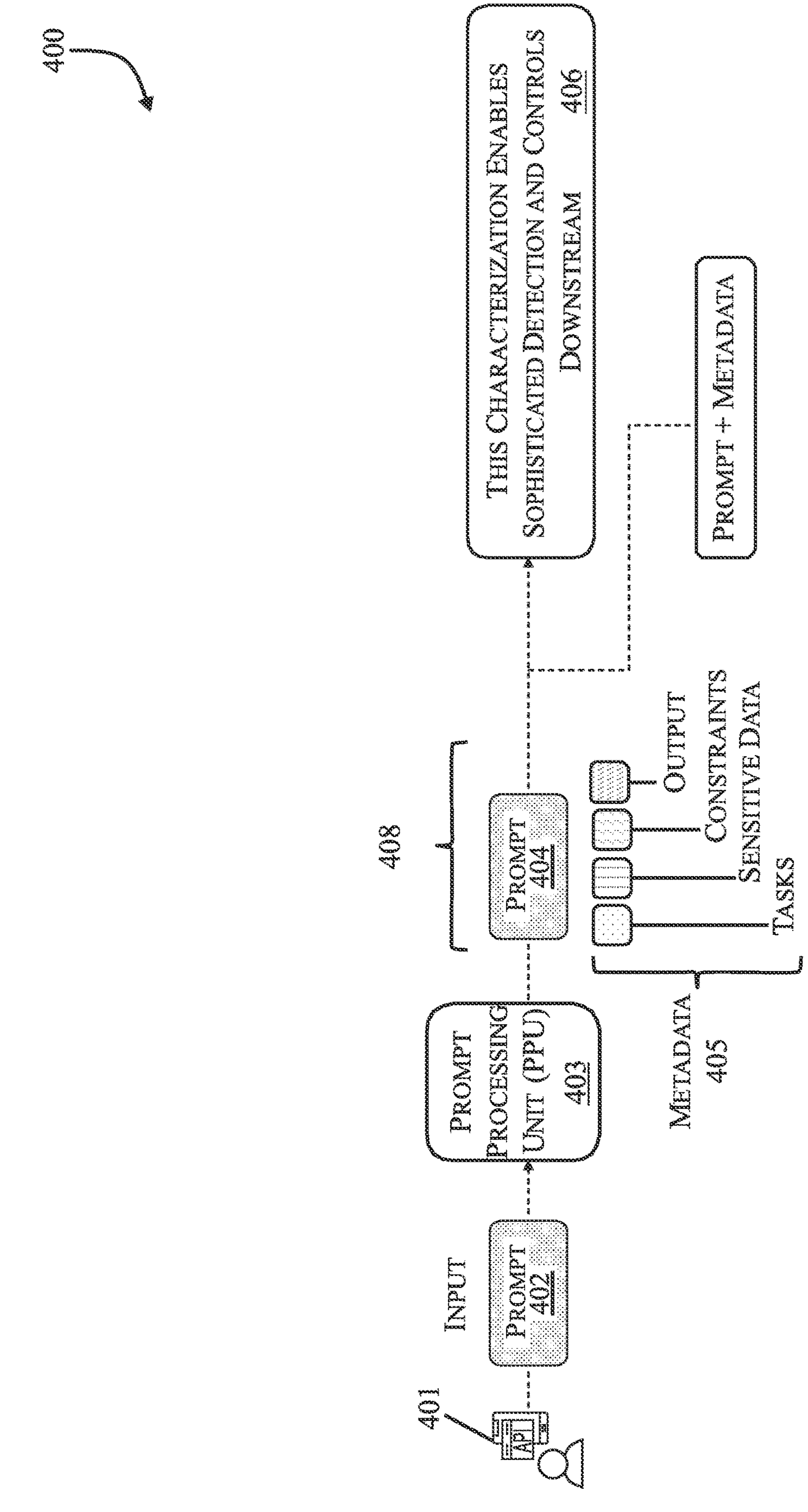
FIG. 4 illustrates an example of an architecture including a prompt processing unit configured to provide prompt observability and estimated productivity gain insights.

FIG. 4 illustrates an example architecture 400 including a prompt processing unit (PPU 403) configured to facilitate the provision of prompt observability and estimated productivity gain. Architecture 400 may be a portion of a data control system that leverages the outputs of the PPU 403 to institute sophisticated threat detection, downstream data controls, prompt optimization, data monitoring, resource utilization monitoring, etc. Typically, architecture 400 may be implemented at the enterprise-controlled portion of the system, although other implementations provide for some or all of its components to be executed externally, as well.

In general, PPU 403 may be a highly efficient processing element that may receive a prompt 402 as an input (e.g., from a user chat interface or an API 401). PPU 403 may parse the prompt 402 and/or may detect a set of key features from prompt 402. For instance, PPU 403 may detect key features within prompt 402 such as the tasks requested, the sensitive data entailed to complete the tasks, any constraints applicable to complete the tasks, and/or the desired output upon completion of such tasks.

PPU 403 may also act as a transparent element, delivering the unmodified prompt 404 augmented with metadata 405 carrying the key features, such as those described above, as output 408. More specifically, a PPU 403 may systematically distill and characterize prompts, thereby enabling new and sophisticated controls downstream 406.

Figure 5:
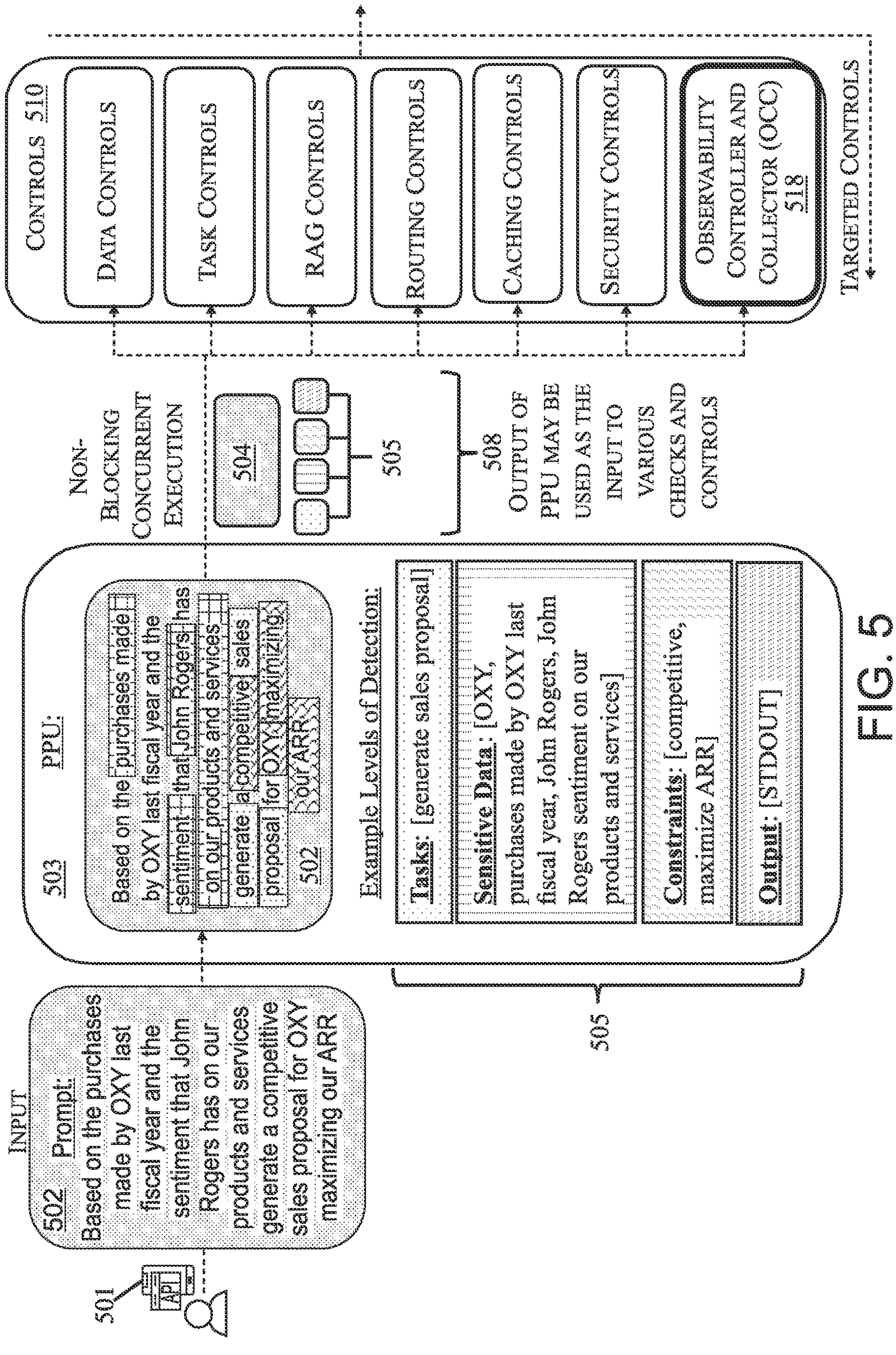
FIG. 5 illustrates an example of an observability and estimated productivity gain system that leverages the outputs of Prompt Processing Units (PPUs)

FIG. 5 illustrates an example of an observability and estimated productivity gain system 500 that leverages the outputs of PPUs. In observability and estimated productivity gain system 500, an input prompt 502 (e.g., sent by a user in the sales department either using a chat interface or an API 501) may be processed by PPU 503. PPU 503 may detect key features in the input prompt 502 such as those outlined above. These features and/or other characterizing data may be packaged as metadata 505.

PPU 503 may generate an output 508 that makes available the output prompt 504 along with the prompt characterization (e.g., metadata 505) to various processes downstream. In various implementations, PPU 503 may fan-out the prompt and the corresponding metadata (e.g., output 508) to various controls (e.g., controls 510). These controls 510 may process the output of PPU 503 concurrently and in a non-blocking manner before the prompt is sent to any external entity. One such example of controls 510 includes observability controller and collector (OCC 518), which may be applied before input prompt 502/output prompt 504 is processed by external entities, in some implementations. Further examples of controls 510 include, but are not limited to, data controls, task controls, retrieval augmented generation (RAG) controls, routing controls, caching controls, security controls, or the like.

Figure 6A:
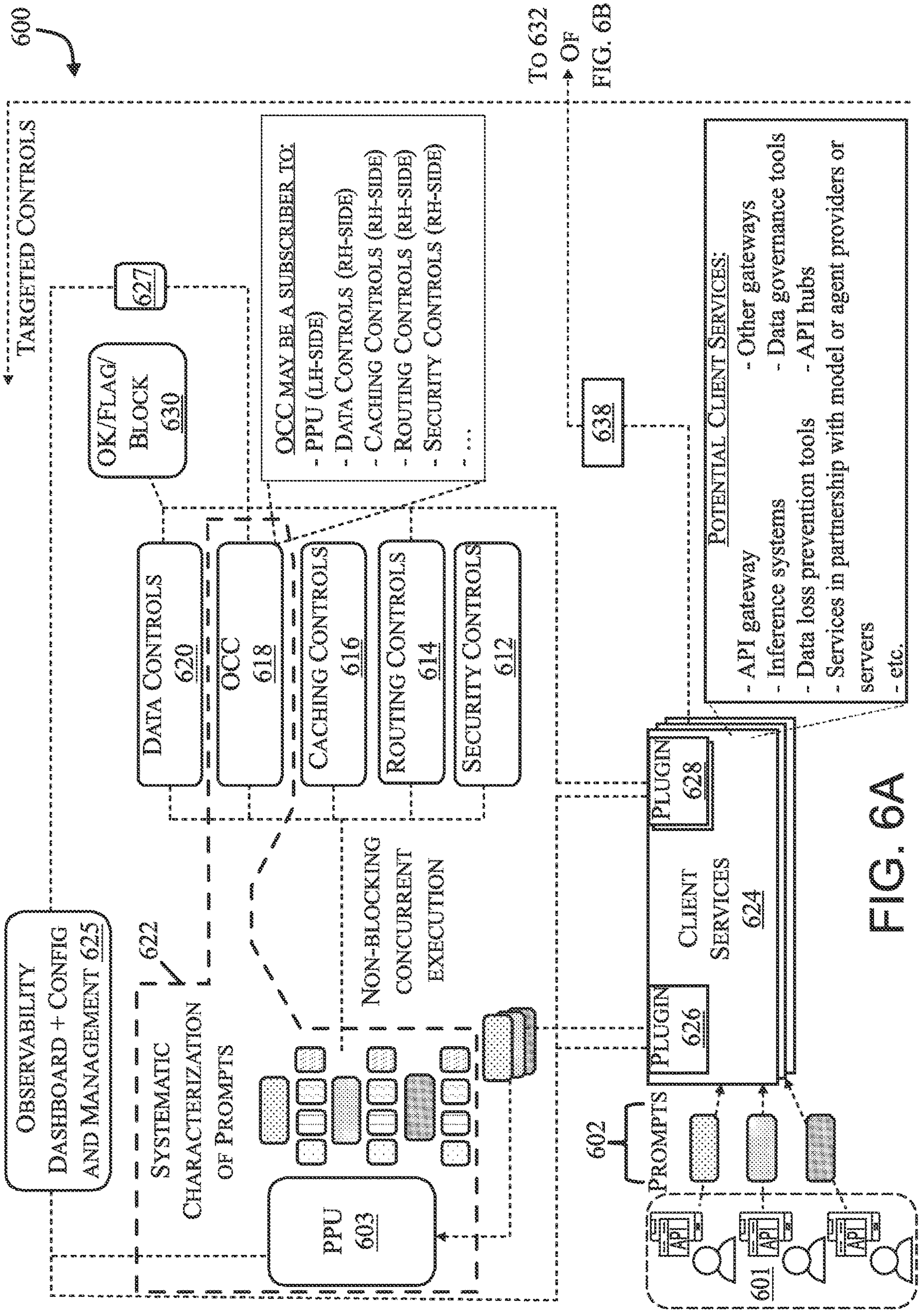
FIGS. 6A-6B illustrate an example of an observability and estimated productivity gain system configured to manage prompt observability and estimated productivity gain insights with multi-prompt processing and/or multi-model or agent distribution.
Figure 6B:
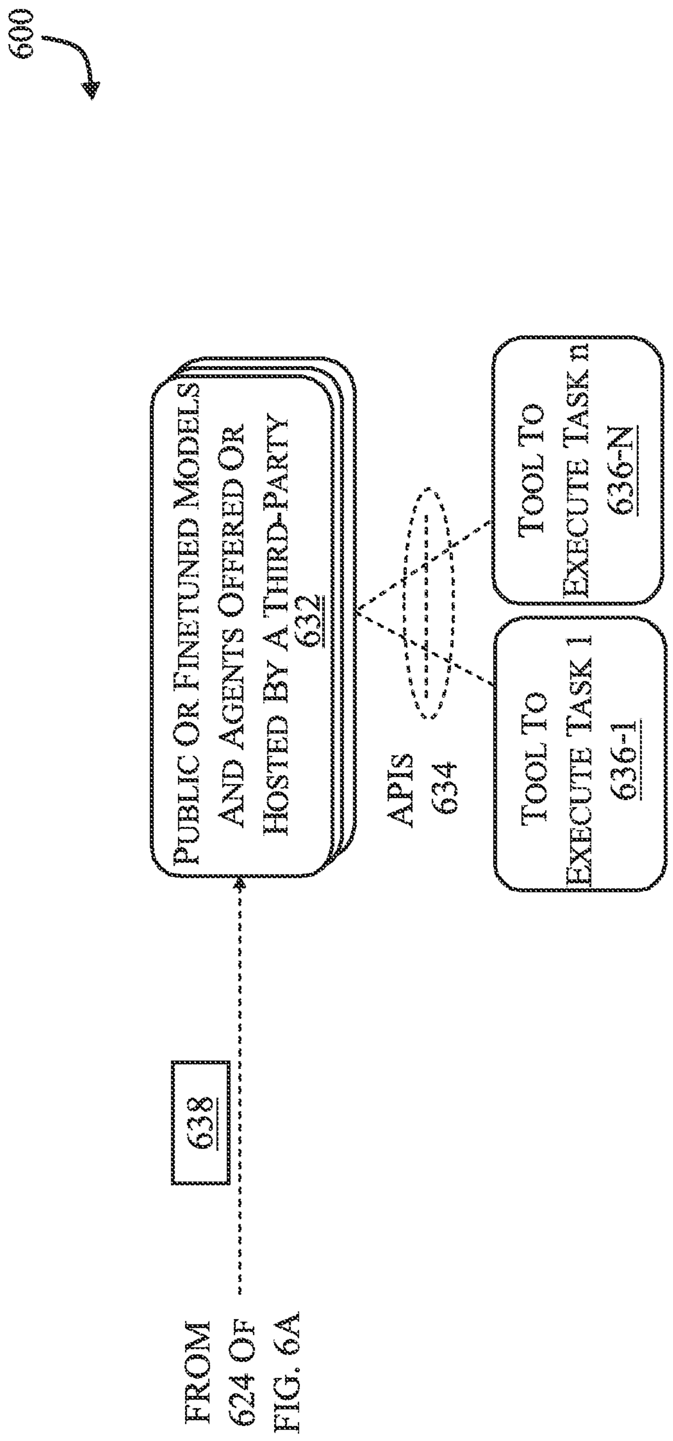

FIGS. 6A-6B illustrate an example of an observability and estimated productivity gain system 600 configured to manage prompt observability and estimated productivity gain with multi-prompt processing and/or multi-model or agent distribution. For example, observability and estimated productivity gain system 600 may be configured to manage prompt observability and estimated productivity gain across various users and/or APIs 601 sending prompts 602 to potentially different models and/or agents offered or hosted by third parties 632.

Various methods may be used to retain and exercise control before the prompts are sent to external entities. For example, an intermediate layer of control may be utilized, such as an API Gateway, other gateways, an inference system, a data governance tool, a data loss prevention (DLP) tool, a service in partnership with model or agent providers or servers, an API Hub, etc. Any of these intermediate elements of control may act as a client service 624 working in concert with element 622, which may comprise PPU 603 and OCC 618 working in tandem.

PPU 603 may interface with client service 624 through plugin 626, which may be used to efficiently redirect the prompts to PPU 603 along with additional metadata. Such metadata may comprise the user ID, the tenant ID, and the App ID (e.g., identified through the API key used) associated to the various users of client service 624. In some implementations, such metadata might be sent by client service 624 directly to the corresponding controllers, e.g., OCC 618 in this case, thereby bypassing PPU 603.

The processing made by OCC 618 may result in the output 627, which might be sent to an observability dashboard and config and management module 625. Observability dashboard and config and management module 625 may manage configuration and/or management of plugin 626, plugin 628, PPU 603, and/or OCC 618.

In addition, observability dashboard and config and management module 625 may manage the collection of data from OCC 618 and/or the display of various prompt related insights. In contrast to existing metering solutions that basically collect operational information from client services, such as the number of prompts processed, by which LLM, the number of tokens used, or the number of prompts carrying PII, the techniques described herein may enable new observability features, by getting additional insights from the prompts and how generative AI is being used and for what, based on the characterization enabled by PPU 603.

More specifically, observability dashboard and config and management module 625, along with OCC 618, may facilitate the provision of answers to questions such as: "What type of tasks are requested?," "What sensitive data is requested or involved?," "By whom?," "By which App?," and/or other relevant questions to the enterprise. Hence, observability dashboard and config and management module 625 may define, apply, and/or manage rules enabling visibility controls working in tandem with a PPU (e.g., with focus on observing and understanding the nature of prompts, including characterization and subsequent (e.g., post-processing) classifications based on the types of prompts generated), aggregating the tasks that are mostly requested as well as posture-related features (e.g., by which tenant/user, from where or which data processor (e.g., which LLM) processed the prompt, etc.).

To this end, OCC 618 may be a subscriber to the outputs of PPU 603 (left hand (LH)-side), data controls 620 (right hand (RH)-side), caching controls 616 (RH-side), routing controls 614 (RH-side), security controls 612 (RH-side), etc. This may facilitate OCC 618 to collect data and gain insights into what sensitive data was used, sent, or received and for which specific tasks, including fine-grained visibility and insights into infringements to corporate policies and/or data controls pushed to plugin 628. Such data collection may also be utilized to develop an understanding of the effectiveness of caching techniques, including insights into which type of prompt responses are predominantly cached.

In various implementations, one or more plugins (e.g., plugin 626) may be used, e.g., to handle various PPUs (e.g., PPU 603) concurrently and potentially distribute the load across users, tenants, and/or applications, and/or ensure isolation among them. Alternatively, or additionally, the PPUs might be specialized elements, which may distill different properties from a prompt depending on the use case. Hence, various plugins (e.g., plugin 626) may be used to segment and redirect prompts to the correct PPUs. In addition, plugins (e.g., plugin 628) may support means to indicate the need to reengineer the prompt, block it, and/or send feedback about the result to the corresponding user or process that issued the prompt.

The prompts that successfully pass the checks and various controls may be sent, at box 638, to the various public or finetuned models and/or agents offered or hosted by third parties 632. As illustrated in FIGS. 6A-6B, such models may be part of larger systems, which may use various APIs 634 and tools 636 (636-1 . . . 636-N) to orchestrate, execute, and chain various tasks before responding to a query carried in a prompt.

Figure 7A:
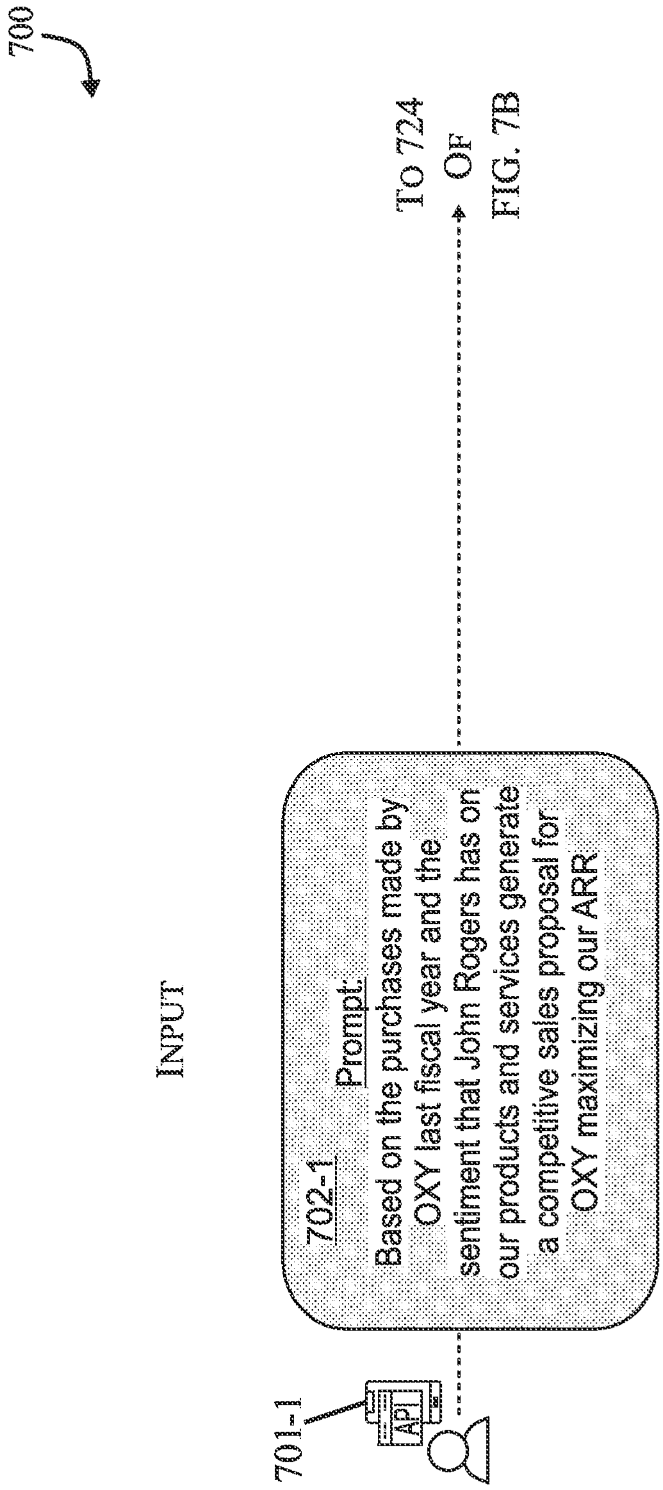
FIGS. 7A-7C illustrate an example of an observability and estimated productivity gain system configured to estimate productivity gains and augmented performance achieved with LLM model utilization.
Figure 7B:
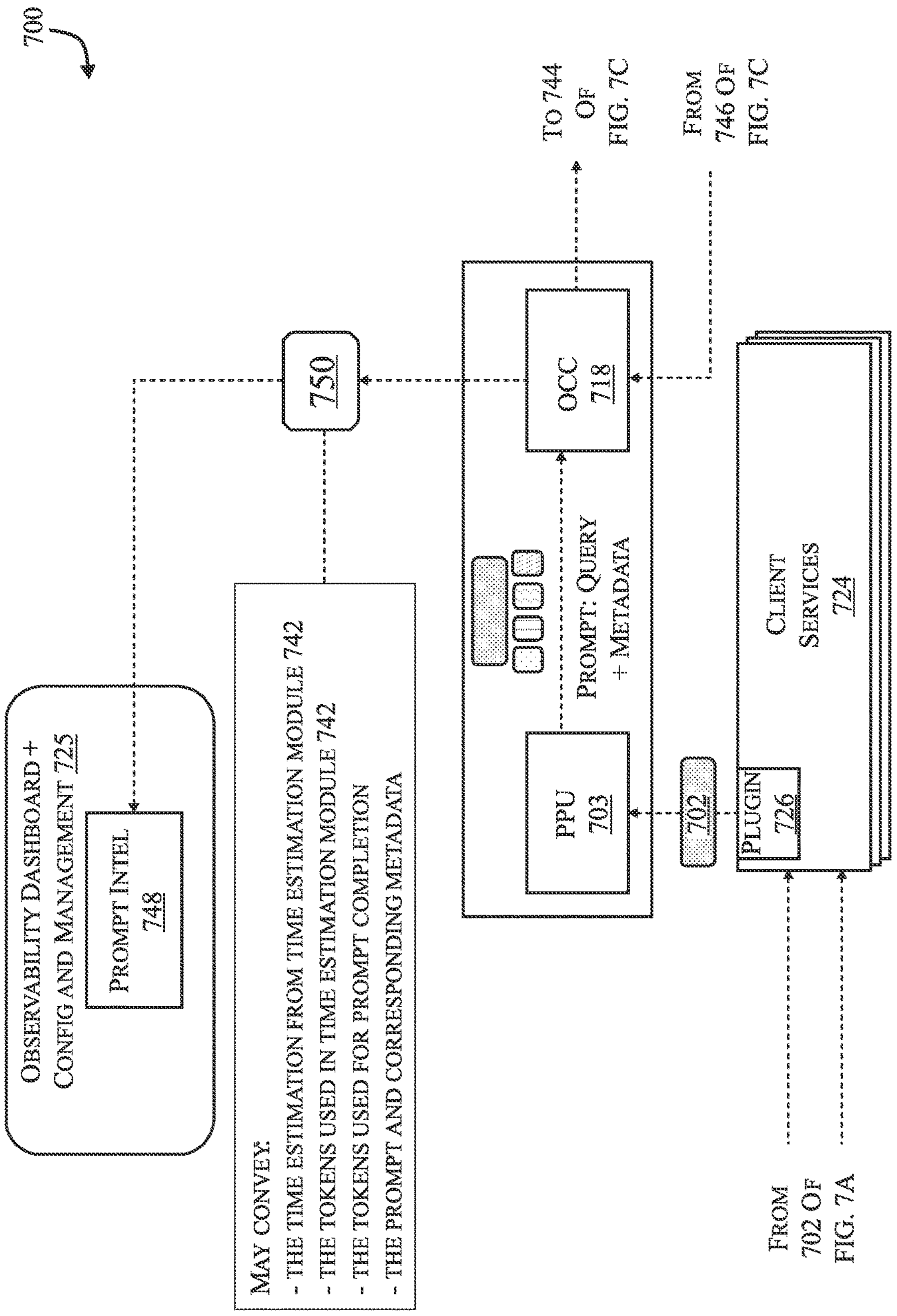
Figure 7C:
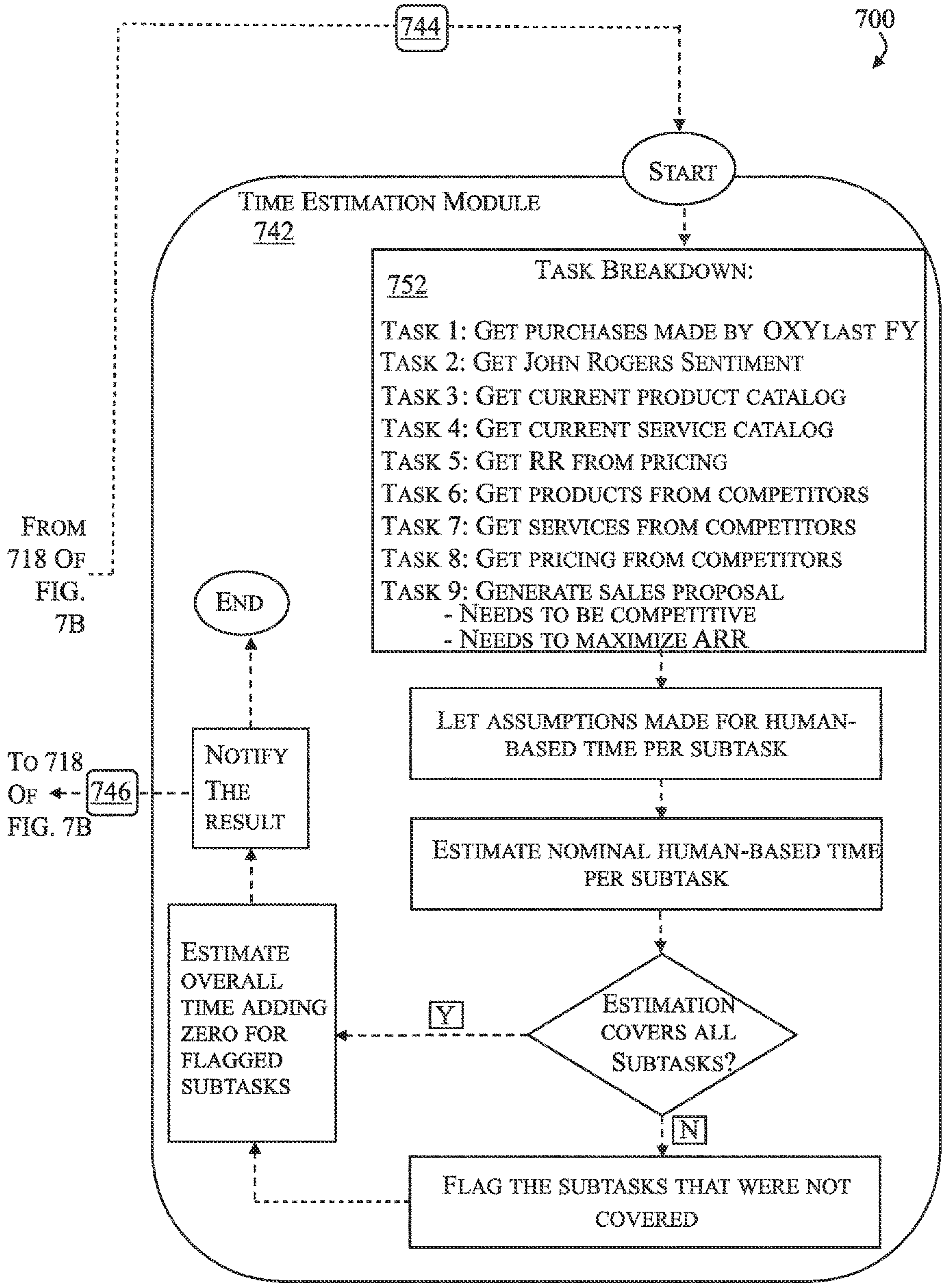

FIGS. 7A-7C illustrate an example of an observability and estimated productivity gain system 700 configured to estimate the productivity gains and augmented performance obtained with model-powered tasks versus non-model-powered tasks. In observability and estimated productivity gain system 700, an input prompt 702 (e.g., sent by a user in the sales department either using a chat interface or an API 701) may be received at client service 724. The input prompt 702 may be sent to PPU 703 through plugin 726. PPU 703 may make the prompt characterization available to OCC 718.

In various implementations, the system may also use a time estimation module 742 in step 744. Here, the characterization of the input prompt 702 supplied by PPU 703 may be provided to time estimation module 742. Time estimation module 742 may parse the characterization supplied by PPU 703 and further breakdown the request into smaller tasks (e.g., breakdown 752).

In contrast to agents that execute the various tasks after the breakdown, time estimation module 742 may not execute any of such tasks. Instead, it may use the breakdown 752 to perform the targeted estimation. For example, time estimation module 742 might be trained or fine-tuned to acquire the specific skill of estimating the effort and associated time that would require a nominal employee (i.e., a human being) to complete each of the subtasks (e.g., in breakdown 752). This may be implemented in different ways, including model-based characterization and Reinforcement Learning with Human Feedback (RLHF).

In order to perform the estimations and provide such visibility, time estimation module 742 may be fed with additional data beforehand that may facilitate time estimation module 742 in building benchmarks and making informed assumptions. These may include access to elements such as the IDs of the users or employees issuing the prompts, their roles, skills, and productivity factors and/or metrics, etc. The additional data fed to time estimation module 742 may also include other benchmarks, such as the various data sources that may be consulted to complete a task, the volume of data that may be consulted, estimated effort to compile the information and generate the outcome (e.g., in hours), and other factors.

The result of time estimation module 742 may be sent to OCC 718 in step 746, which may make it available to observability dashboard and config and management module 725 in step 750. The information (e.g., inputs) sent by OCC 718 to observability dashboard and config and management module 725 in step 750 may include the time estimation from time estimation module 742, the tokens used in time estimation module 742, the tokens used for prompt completion, and/or the prompt and the corresponding metadata as characterized by PPU 703.

The data provided by OCC 718 in step 746 may feed prompt intel module 748 within observability dashboard and config and management module 725, which may use the inputs outlined above to translate the estimated time needed to complete the task into a cost. For example, observability dashboard and config and management module 725 may be fed beforehand with compensation data for the employee that issued the prompt, and therefore, it may have the means to estimate the cost savings if the prompt is completed successfully.

One or more of the various insights that are generated throughout execution of the observability and estimated productivity gain system 700 may be graphically presented to a user as graphical user interface (GUI) (e.g., GUI 800 of FIG. 8, GUI 900 of FIG. 9, dashboard configuration GUI 1000 of FIG. 10A, task characterization GUI 1002 of FIG. 10B, prompt intelligence configuration GUI 1004 of FIG. 10C, etc.) via a user interface device. In addition, these insights may be actionable and/or trigger actions based on the data and/or patterns observed in the insight. For example, these insights may be leveraged in order to execute data controls, generate prompt templates, manage prompting, and/or various other tasks related to management of generative AI utilization within an enterprise.

Figure 8:
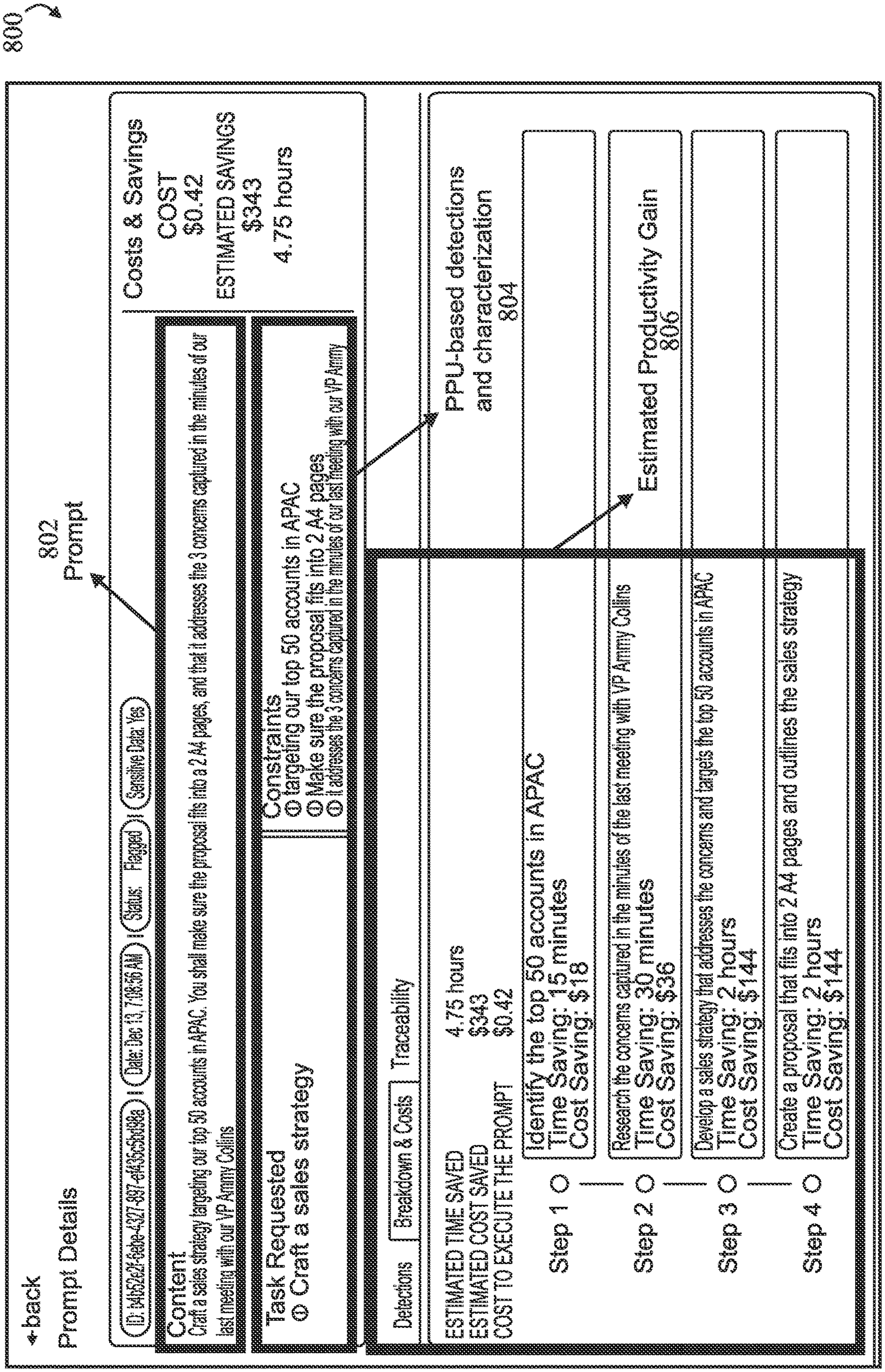
FIG. 8 illustrates an example of a user interface of an observability and estimated productivity gain system.

FIG. 8 illustrates an example of an GUI 800 of an observability and estimated productivity gain system. For example, GUI 800 may include a graphical representation of elements/products of the execution of the observability techniques described herein deliverable via a user interface.

GUI 800 may include information regarding various elements/products of the observability and estimated productivity gain system. For instance, GUI 800 may include prompt data 802. Prompt data 802 may include information such as the contents of a prompt under analysis.

In addition, GUI 800 may include PPU-based detections and characterizations 804. PPU-based detections and characterizations 804 may include information such as a list of the task or tasks requested or implicated within the prompt under analysis. Additionally, PPU-based detections and characterizations 804 may include information such as the constraints associated with the prompt under analysis.

GUI 800 may also include estimates of productivity gains (e.g., estimated productivity gain 806). The estimated productivity gain 806 may include an estimate of the time savings, cost savings, computational resource savings, cost of execution, etc. associated with the execution of the prompt under analysis.

In various implementations, the estimated time savings may be computed by solely analyzing the task requested on a prompt request. In additional implementations, a more accurate estimation may be realized by computing the estimate after prompt completion. For instance, this approach would avoid estimating certain productivity gain when, in fact, the model hallucinated and completed the prompt in a way that is not useful.

Other cases where the responses received from the models and/or agents may not be entirely useful or be partially useful may occur as well. Hence, additional training techniques may be applied to a time estimation module (e.g., time estimation module 742 in FIG. 7C), including RLHF though in this case, covering also the responses received from the models and/or agents. Alternatively, or additionally, the estimated time savings may apply at a session level, instead of on a prompt-by-prompt basis, or combinations of these.

Figure 9:
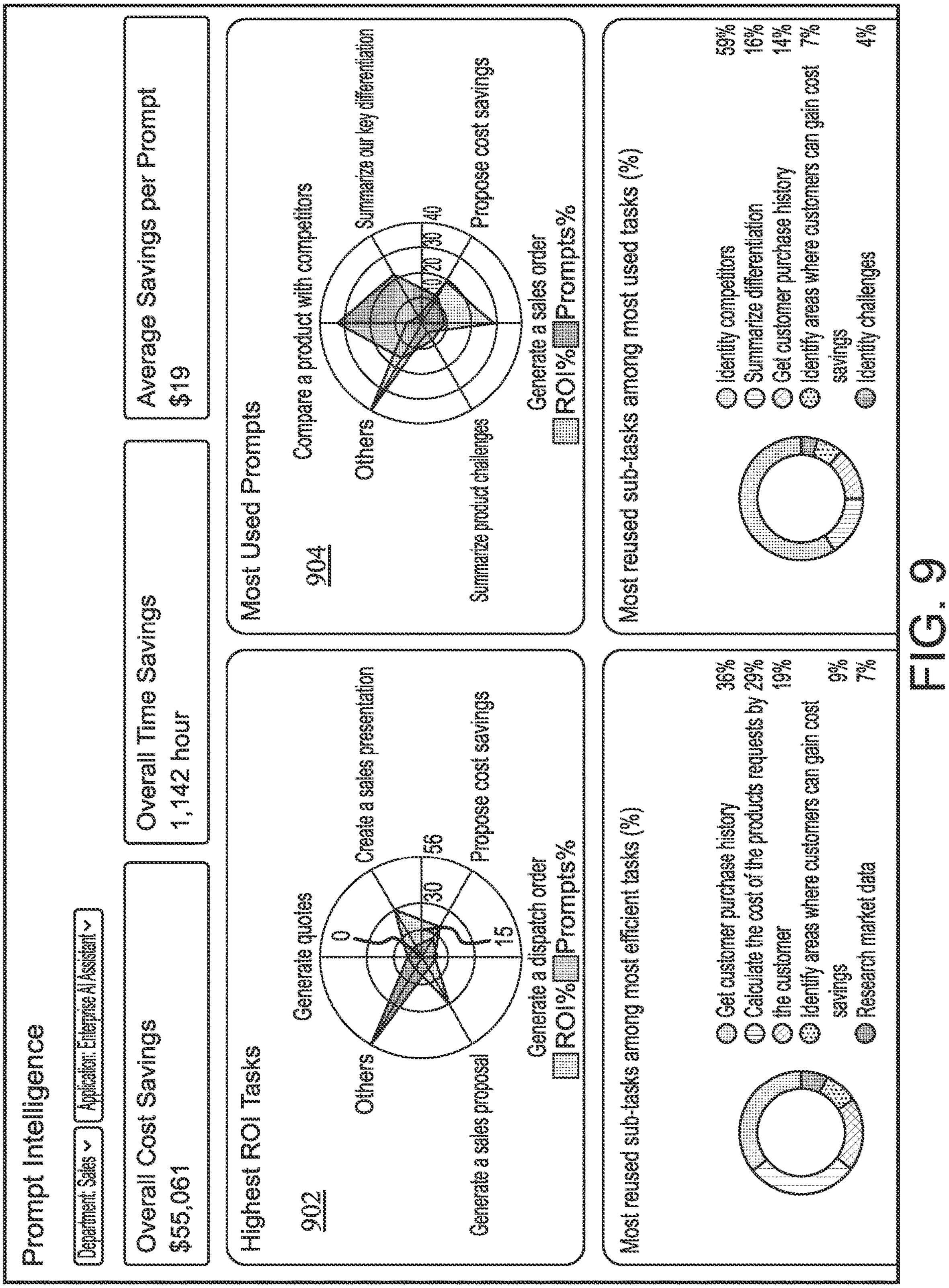
FIG. 9 illustrates an example of another user interface of an observability and estimated productivity gain system.

FIG. 9 illustrates an example of a GUI 900 of an observability and estimated productivity gain system. GUI 900 may include a graphical representation of elements/products of the execution of the observability techniques described herein deliverable via a user interface.

In various implementations, post-processing techniques might be applied to the prompts as part of a prompt intel module (e.g., prompt intel module 748 in FIG. 7B), to analyze and cluster the prompts that returned the largest time savings. GUI 900 is an example implementation providing such visibility, including a comparison between prompts requesting tasks that yield the highest returns 902 versus the tasks that were most frequently requested 904 as part of the prompts.

Moreover, the insights extracted through prompt intel module might be actionable and be used not only for prompt templating (e.g., by restricting the utilization of generative AI to prompt templates that have been engineered to ensure substantial time savings and productivity gains) but also to control, prioritize, filter, and/or block prompts where the tasks detected by a PPU are known to yield very low productivity gains. Those skilled in the art will appreciate that these are non-limiting examples, and other possible observations and/or visibility features may apply as well.

Figure 10A:
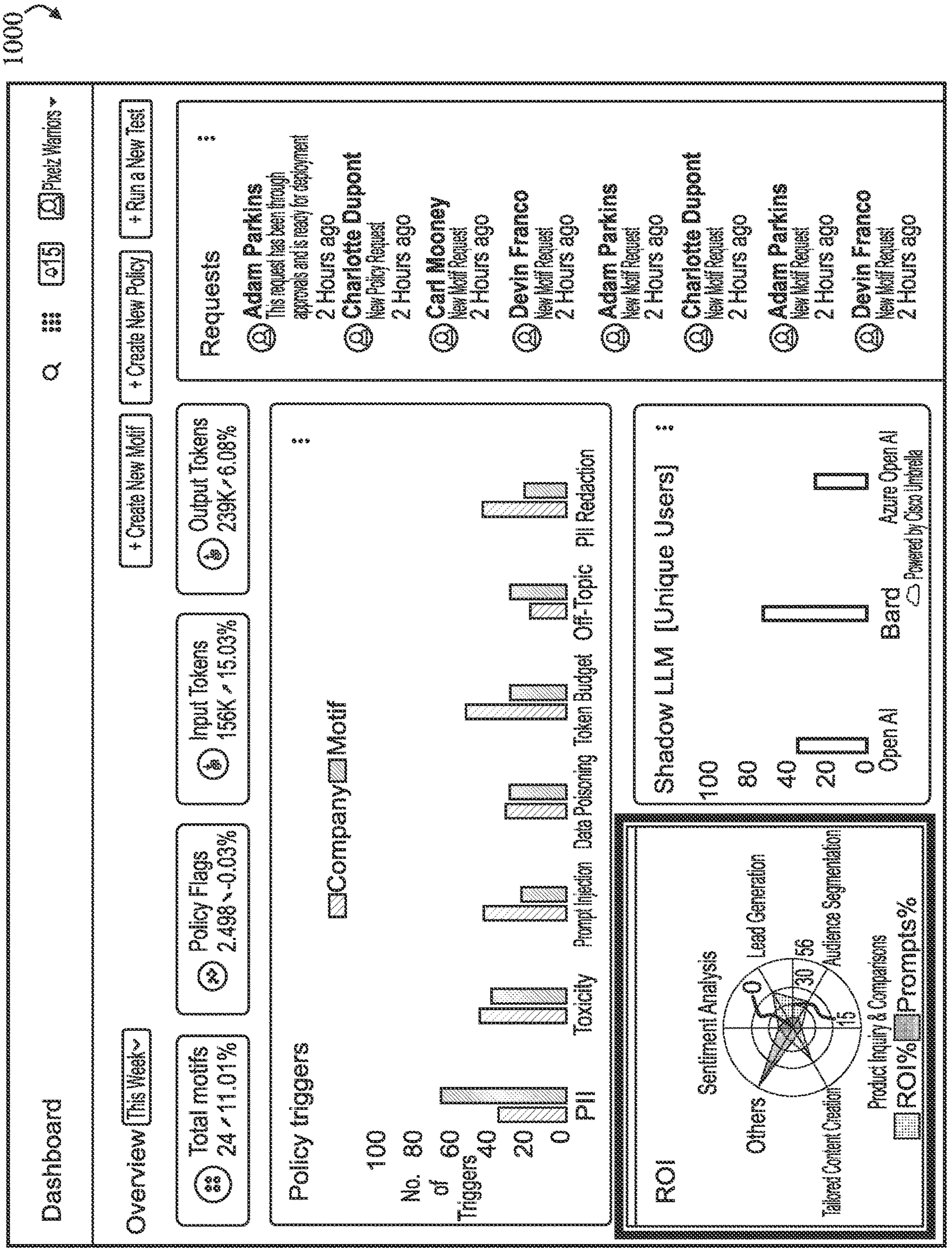
FIGS. 10A-10C illustrate examples of additional user interfaces of an observability and estimated productivity gain system.
Figure 10B:
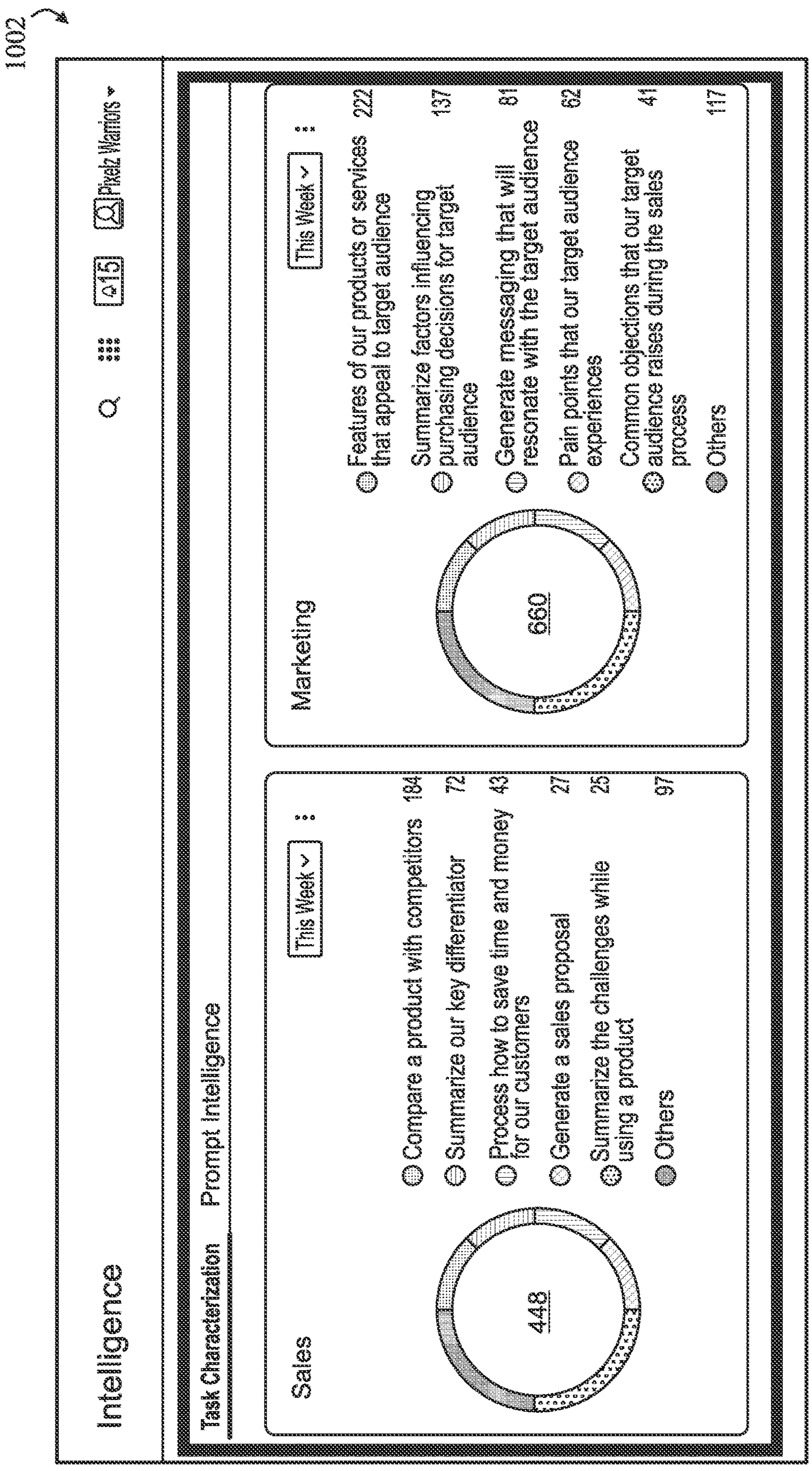
Figure 10C:
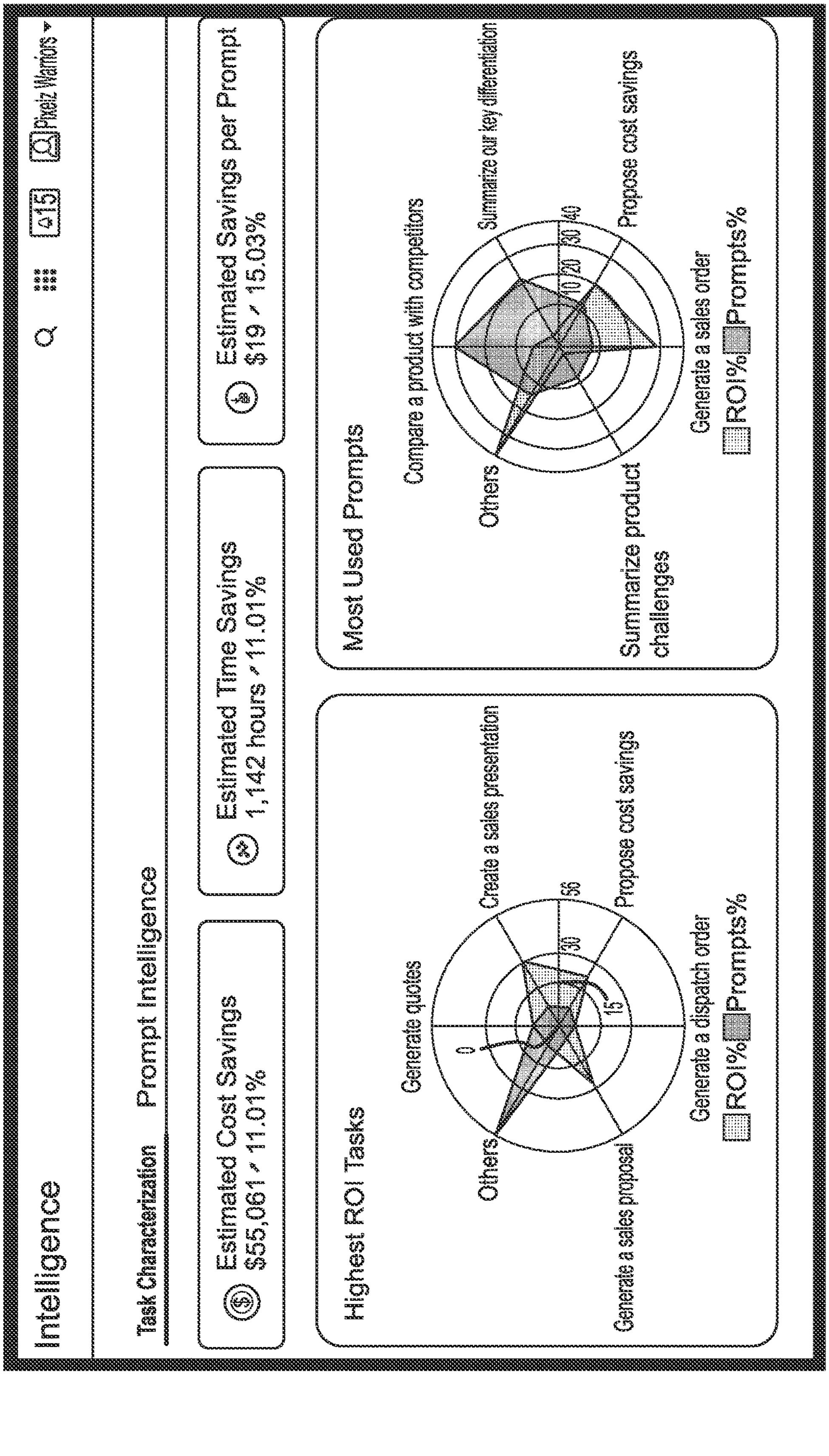

FIG. 10A-10C illustrate examples of additional outputs of an observability and estimated productivity gain system. The additional outputs may include graphical representations of elements/products of the execution of the observability techniques described herein that are deliverable via a user interface. The additional outputs may assume various configurations of these elements/products to empower a user with insights into productivity gains, prompt performance, prompt characteristics, etc.

For example, an output may include a dashboard configuration GUI 1000. The dashboard configuration GUI 1000 may include an overview of generative AI activity for a user/enterprise. For instance, the dashboard configuration GUI 1000 may include information such as a policy flag count, input/output token utilization, policy trigger data, return on investment data, model utilization data, etc.

Additionally, an output may include a task characterization GUI 1002. A task characterization GUI 1002 may include data characterizing the tasks utilized over a period of time for an entity (e.g., particular user, group of users, department, enterprise, etc.) Accordingly, task characterization GUI 1002 may be utilized to determine what are the most commonly used tasks for an entity over the period of time.

Further, an output may include a prompt intelligence configuration GUI 1004. A prompt intelligence configuration GUI 1004 may include data characterizing estimated cost savings, estimated time savings, estimated saving per prompt, highest return on investment (ROI) tasks, most used prompts, etc. across one or more prompts.

Figure 11:
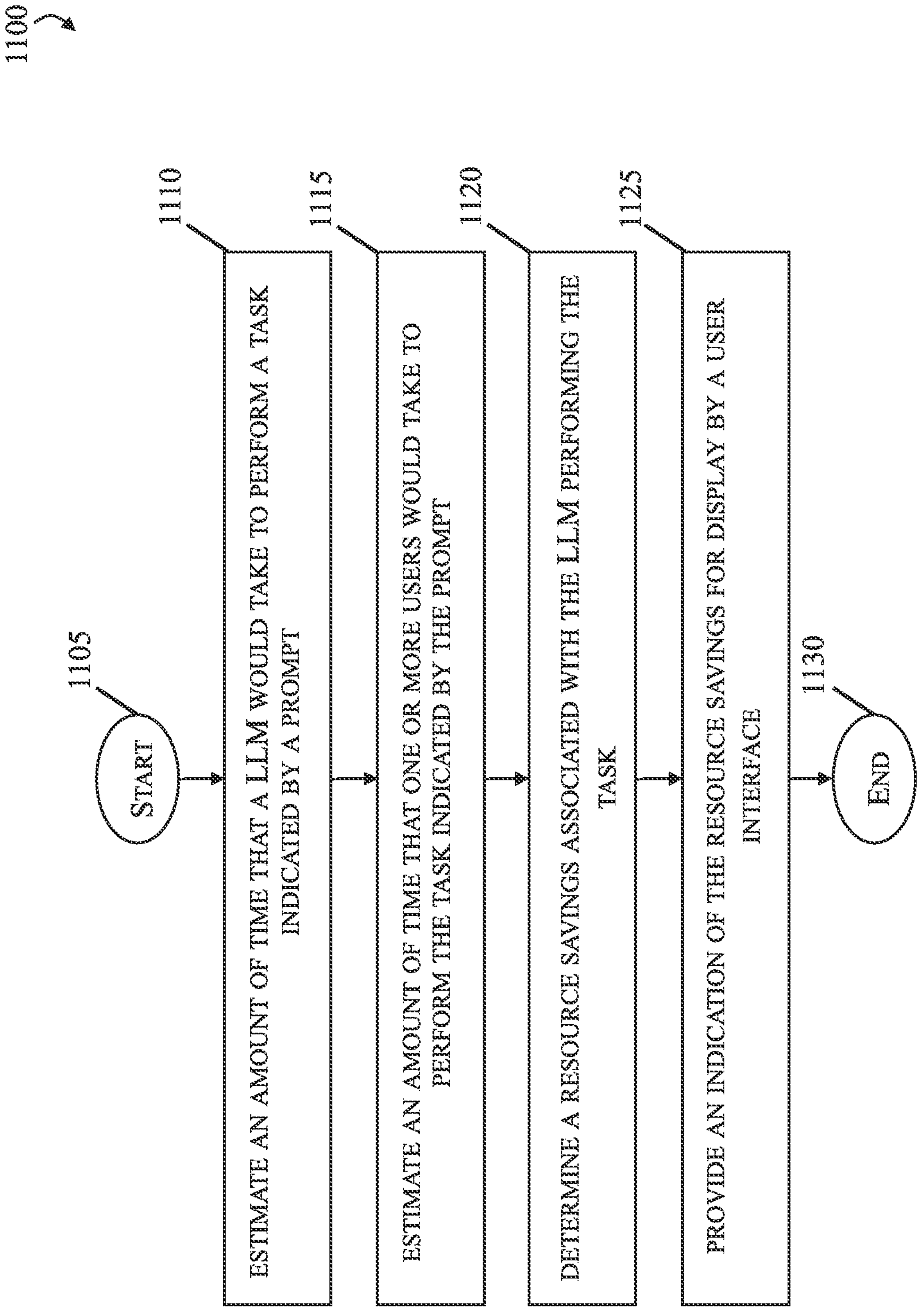
FIG. 11 illustrates an example simplified procedure for observability and estimated productivity gain insights using PPUs in accordance with one or more implementations described herein.

FIG. 11 illustrates an example of a simplified procedure for observability and estimated productivity gain insights using PPUs in accordance with one or more implementations described herein. For example, a non-generic, specifically configured device (e.g., device 200) may perform procedure 1100 by executing stored instructions (e.g., language model process 248). The procedure 1100 may start at step 1105, and continues to step 1110, where, as described in greater detail above, a device may estimate the amount of time that an LLM model would take to perform a task indicated by a prompt. In various implementations, the device may wherein the device may use a prompt processing unit to identify the task indicated by the prompt, prior to the prompt being sent to the large language model for processing. In some implementations, the prompt processing unit may identify two or more subtasks of the task, as well.

At step 1115, as detailed above, the device may estimate an amount of time that one or more users would take to perform the task indicated by the prompt.

At step 1120, the device may determine a resource savings associated with the LLM performing the task. This determination may be based on a comparison between the amount of time that the LLM would take to perform the task and the amount of time that the one or more users would take to perform the task. Various other factors may be considered in this determination such as the book value (e.g., the resource cost assigned or allotted to the manual performance of the task, etc.) of a task performed by a user, the hourly value of the user submitting the prompt, etc.

As detailed above, at step 1125, the device may provide an indication of the resource savings for display by a user interface. The indication of the resource savings may include an indication of cost savings associated with having the LLM perform the task. In some instances, the indication of resource savings may include an indication of time savings associated with having the LLM perform the task.

In various implementations, the indication of resource savings may also include indication of a cost (e.g., computation resource, token, etc.) to perform the task using the large language model. In addition, the indication of resource savings may include data and suggestions to aid in shaping prompts to the LLM such that they achieve maximum efficiency and/or minimal resource consumption. For example, the indication of the resource savings may further indicate one or more prompt templates to perform the task using the large language model. These prompt templates may include suggested prompts having been shown to produce the highest quality results with the lowest resource consumption.

The indication of the resource savings may be specific to the resource savings for a particular task. However, in some instances, the indication of the resource savings may be cumulative. For example, the indication of the resource savings may be indicative of cumulative resource savings with respect to a plurality of tasks within a single prompt, cumulative to a user across multiple tasks/prompts, cumulative to an enterprise across multiple users, etc.

For example, in some implementations the device may generate a statistical compilation of a return on investment across a plurality of task performances by the large language model and/or provide, based on the statistical compilation, an indication of highest ROI tasks for display by the user interface. Further, an indication of most reused sub-tasks among most efficient tasks processed by the large language model may be identified based on the statistical compilation and/or provided for display by the user.

In additional examples, the device may generate a statistical compilation of most utilized prompts across a plurality of prompts submitted for processing by the large language model and/or provide, based on the statistical compilation, an indication of most utilized prompts for display by the user interface. Furthermore, an indication of most reused sub-tasks among most used tasks may be identified based on the statistical compilation and/or provided for display by the user.

Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, facilitate enterprises in leveraging generative AI while providing a mechanism to understand, observe, and apply policies that depend on the type tasks requested by their employees, before any such prompts/requests are sent to an external LLM for processing. Specifically, these techniques leverage PPUs to characterize and distill key features from a prompt in a systematic manner.

These characterizations may then be utilized to define and apply rules enabling visibility controls working in tandem with a PPU, with focus on observing and understanding the nature of the requests carried in the prompts. This may include the automated detection, characterization, and observation of the tasks requested to a generative AI at inference time.

Further, these characterizations may be utilized to gain visibility and insights into what sensitive data is used, sent, or received and for which specific tasks, including fine-grained observability and insights into infringements to corporate policies and/or data controls at inference time. Furthermore, these characterizations may be used to estimate and observe the time savings with generative AI versus non-model-powered tasks. More specifically, the techniques described herein may facilitate the breakdown of the task requested in a prompt into a set of subtasks, and automatically estimate the time that it would take an employee to execute each subtask, as well as the overall task, without the assistance of generative AI.

The insights provided by these techniques may be actionable and/or utilized to trigger various responses. For example, the characterizations may be used to facilitate the templating of prompts, particularly, for the tasks that yield the largest returns (e.g., in terms of time savings). In addition, the characterizations may be utilized to control, prioritize, filter, and/or block prompts where the tasks detected by a PPU are known to yield very low productivity gains. In all, these techniques may not only speed adoption of generative AI for enterprises but may also provide a mechanism by which enterprises achieve control, visibility, and optimization over their use of generative AI.

While there have been shown and described illustrative implementations that provide for observability and estimated productivity gain using prompt processing units, it is to be understood that various other adaptations and modifications may be made within the spirit and scope of the implementations herein. For example, while certain implementations are described herein with respect to using certain elements, modules, components, architectures, etc. for the purposes of observability and estimated productivity gain, the elements, modules, components, architectures, etc. are not limited as such and may be used for other functions, in other arrangements, in other functional distributions, in other implementations, etc.

In addition, while certain types of metadata and data types/categories such as tasks, sensitive data, constraints, and outputs are shown, other suitable metadata and data types/categories may be used, accordingly. Moreover, while particular examples of the elements/products represented in outputs such as estimated cost savings, estimated time savings, estimated saving per prompt, highest return on investment (ROI) tasks, most used prompts, etc. are described, other suitable data related to observability and/or productivity gains may be generated and/or incorporated in the outputs, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as tangible, non-transitory, computer-readable medium having computer-executable instructions stored thereon that, when executed by a processor on a computer, cause the computer to perform a method.

For example, the components and/or elements may be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:

estimating, by a device, an amount of time that a large language model would take to perform a task indicated by a prompt;

estimating, by the device, an amount of time that one or more users would take to perform the task indicated by the prompt;

determining, by the device, a resource savings associated with the large language model performing the task, based on a comparison between the amount of time that the large language model would take to perform the task and the amount of time that the one or more users would take to perform the task;

generating, by the device, a statistical compilation of a return on investment across a plurality of task performances by the large language model; and providing, by the device, for display by a user interface;

an indication of the resource savings, an indication of highest ROI (return on investment) tasks based on the statistical compilation, and an indication of most reused sub-tasks among most efficient tasks processed by the large language model based on the statistical compilation.

2. The method of claim 1, wherein the device uses a prompt processing unit to identify the task indicated by the prompt, prior to the prompt being sent to the large language model for processing.

3. The method of claim 2, wherein the prompt processing unit identifies two or more subtasks of the task.

4. The method of claim 1, wherein the indication of the resource savings includes an indication of resource savings across a plurality of tasks included in the prompt.

5. The method of claim 1, wherein the indication of the resource savings further indicates one or more prompt templates to perform the task using the large language model.

6. The method of claim 1, wherein the indication of the resource savings includes an indication of a time savings.

7. The method of claim 1, further comprising:

generating a statistical compilation of most utilized prompts across a plurality of prompts submitted for processing by the large language model; and providing, based on the statistical compilation, an indication of most utilized prompts for display by the user interface.

8. The method of claim 7, further comprising:

providing, based on the statistical compilation, an indication of most reused sub-tasks among most used tasks for display by the user interface.

9. An apparatus, comprising:

one or more network interfaces to communicate with a network;

a processor coupled to the one or more network interfaces and configured to execute one or more processes; and a memory configured to store a process that is executable by the processor, the process, when executed, configured to:

estimate an amount of time that a large language model would take to perform a task indicated by a prompt;

estimate an amount of time that one or more users would take to perform the task indicated by the prompt;

determine a resource savings associated with the large language model performing the task, based on a comparison between the amount of time that the large language model would take to perform the task and the amount of time that the one or more users would take to perform the task;

generate a statistical compilation of a return on investment across a plurality of task performances by the large language model; and provide for display by a user interface;

an indication of the resource savings, an indication of highest ROI (return on investment) tasks based on the statistical compilation, and an indication of most reused sub-tasks among most efficient tasks processed by the large language model based on the statistical compilation.

10. The apparatus as in claim 9, wherein the apparatus uses a prompt processing unit to identify the task indicated by the prompt, prior to the prompt being sent to the large language model for processing.

11. The apparatus as in claim 10, wherein the prompt processing unit identifies two or more subtasks of the task.

12. The apparatus as in claim 9, wherein the indication of the resource savings includes an indication of resource savings across a plurality of tasks included in the prompt.

13. The apparatus as in claim 9, wherein the indication of the resource savings further indicates one or more prompt templates to perform the task using the large language model.

14. The apparatus as in claim 9, wherein the indication of the resource savings includes an indication of a time savings.

15. The apparatus as in claim 9, the process further configured to:

generate a statistical compilation of most utilized prompts across a plurality of prompts submitted for processing by the large language model;

provide, based on the statistical compilation, an indication of most utilized prompts for display by the user interface; and provide, based on the statistical compilation, an indication of most reused sub-tasks among most used tasks.

16. A tangible, non-transitory, computer-readable medium having computer-executable instructions stored thereon that, when executed by a processor on a computer, cause the computer to perform a method comprising:

estimating an amount of time that a large language model would take to perform a task indicated by a prompt;

estimating an amount of time that one or more users would take to perform the task indicated by the prompt;

determining a resource savings associated with the large language model performing the task, based on a comparison between the amount of time that the large language model would take to perform the task and the amount of time that the one or more users would take to perform the task;

generating a statistical compilation of a return on investment across a plurality of task performances by the large language model; and providing for display by a user interface;
an indication of the resource savings,
an indication of highest ROI (return on investment) tasks based on the statistical compilation, and
an indication of most reused sub-tasks among most efficient tasks processed by the large language model based on the statistical compilation.

17. The tangible, non-transitory, computer-readable medium as in claim 16, wherein the computer uses a prompt processing unit to identify the task indicated by the prompt, prior to the prompt being sent to the large language model for processing.

18. The tangible, non-transitory, computer-readable medium as in claim 17, wherein the prompt processing unit identifies two or more subtasks of the task.

19. The tangible, non-transitory, computer-readable medium as in claim 16, wherein the indication of the resource savings includes an indication of resource savings across a plurality of tasks included in the prompt.

20. The tangible, non-transitory, computer-readable medium as in claim 16, wherein the indication of the resource savings further indicates one or more prompt templates to perform the task using the large language model.

* * * * *